United States Patent
Gutowski

(10) Patent No.: US 7,035,632 B2
(45) Date of Patent: Apr. 25, 2006

(54) PATH LOSS DATA NORMALIZATION FOR GROWTH MANAGEMENT OF A CELLULAR SYSTEM

(75) Inventor: Stan J. Gutowski, Arlington, VA (US)

(73) Assignee: ScoreBoard, Inc., Herndon, VA (US)

( * ) Notice: Subject to any disclaimer, the term of this patent is extended or adjusted under 35 U.S.C. 154(b) by 592 days.

(21) Appl. No.: 09/951,504

(22) Filed: Sep. 14, 2001

(65) Prior Publication Data

US 2002/0058503 A1     May 16, 2002

Related U.S. Application Data

(60) Provisional application No. 60/235,435, filed on Sep. 26, 2000.

(51) Int. Cl.
H04Q 7/20     (2006.01)
H04B 1/00     (2006.01)
H04B 15/00    (2006.01)
H04B 1/10     (2006.01)

(52) U.S. Cl. .................. 455/423; 455/422.1; 455/424; 455/456.5; 455/63.4; 455/67.11

(58) Field of Classification Search ................ 455/446, 455/447, 423–424, 67.1, 63.1–63.4, 67.11, 455/67.13, 67.14, 67.16, 422.1, 456.1, 456.5, 455/456.6, 501, 513

See application file for complete search history.

(56) References Cited

U.S. PATENT DOCUMENTS 5,151,704 A     9/1992   Gunmar et al.

(Continued)

OTHER PUBLICATIONS

Rappart and Hawbaker: "Effects of Ciruclar and Linear Polarized Antennas on Wideband Propagation Parameters in Indoor Radio Channels", GLOBECOM '91, vol. 3, Dec. 2, 1991, pp. 1287-1291.

Primary Examiner—Binh K. Tieu
(74) Attorney, Agent, or Firm—Duane Morris LLP

(57) ABSTRACT

The RF propagation of a wireless system is normalized to remove the directionality, orientation and gain characteristics of the antennae deployed in the system to allow for enhanced growth management of a wireless system. RF propagation data for a wireless system is gathered by any collection method. For example, drive test of the cellular system can be performed to receive and measure the signal strength throughout the system to determine the receive power of signals from cell sites in the system. Other methods such as uplink collection, E911 data can be used. After measurements of the system are collected, the data is post-processed to remove the effective gain achieved by each antenna associated with each of the signals to normalize the signals to a conceptual antenna having an isotropic radiation pattern. A database of the antenna gain and deployment patterns of the actual antennae in the system is used to normalize the data. The expected receive power of the conceptual antennae signals at the locations throughout the cellular system are determined using a propagation model. The modeled conceptual signals correspond to the measured signals and the characteristics of the conceptual antennae substituted to model the conceptual signals. The Propagation modeling can be revised through analysis of the correlation with the measured data. Once the system has been normalized and the propagation model is acceptably accurate, the system designer can model data corresponding to a variety of antenna gain, directionality and orientation choices to effectively enhance growth management through effective redeployment and specification of antennae without the need to physically experiment with antenna of varying characteristics and perform numerous data collections after antennae substitutions or reconfigurations. A final data collection such as a final drive test can be performed after implementation of a new antenna deployment.

8 Claims, 11 Drawing Sheets

U.S. PATENT DOCUMENTS

| | | | |
|---|---|---|---|
| 5,450,615 A * | 9/1995 | Fortune et al. | 455/67.16 |
| 5,465,390 A * | 11/1995 | Cohen | 455/446 |
| 5,561,841 A | 10/1996 | Markus | |
| 5,926,762 A * | 7/1999 | Arpee et al. | 455/447 |
| 6,289,203 B1 * | 9/2001 | Smith et al. | 455/67.11 |
| 6,496,700 B1 * | 12/2002 | Chawla et al. | 455/435.2 |
| 6,571,082 B1 * | 5/2003 | Rahman et al. | 455/67.11 |
| 6,580,911 B1 * | 6/2003 | Clancy | 455/446 |
| 6,625,135 B1 * | 9/2003 | Johnson et al. | 370/332 |
| 6,665,542 B1 * | 12/2003 | Clancy | 455/504 |
| 6,711,404 B1 * | 3/2004 | Arpee et al. | 455/423 |
| 6,745,038 B1 * | 6/2004 | Callaway et al. | 455/456.1 |
| 6,748,233 B1 * | 6/2004 | Arnold et al. | 455/522 |

\* cited by examiner

PATH LOSS DATA NORMALIZATION FOR GROWTH MANAGEMENT OF A CELLULAR SYSTEM

REFERENCE TO RELATED APPLICATIONS

This application is a continuation-in-part of provisional patent application No. 60/235,435, filed Sep. 26, 2000, from which benefit is claimed of the provisional application.

FIELD OF THE INVENTION

This invention relates to the management of channel interference in a cellular telephone systems and, more particularly, to a the improved analysis of the RF propagation in a cellular system for improved deployment of antenna designs, configurations and orientations.

BACKGROUND OF THE INVENTION

Present day commercial mobile communication systems typically have a plurality of fixed-location base stations arranged in patterns in which each base station has a plurality of antennae divided among a number of sectors, to transmit and receive on a number of frequencies. The distribution of antennae, sectors and assignment of frequencies as well as the selection of antennae is intended to be optimize coverage. The channels used by a base station are separated from one another in frequency sufficiently that signals on any channel do not interfere with signals on another channel from that base station.

However, in order to allow mobile units to transmit and receive telephone communications over a wide area, each cell is normally positioned with its area of coverage adjacent and overlapping the areas of coverage of a number of other cells. When a mobile unit moves from an area covered by one base station to that covered by another, the communication is transferred from the former station to the latter in an area where the coverage from the different cells overlaps. Because of this overlapping coverage, the channels allotted to the cells are carefully selected so that adjoining cells do not transmit or receive on the same frequencies. The channels used by adjoining base stations are also supposedly separated from one another in frequency sufficiently that signals from any base station do not interfere with signals from another nearby base station. This is typically accomplished by assigning channels to some central cell, which are widely separated in frequency in the manner described above, and then assigning channels to the cells surrounding that central cell using a pattern to optimize coverage and minimize interference. The pattern of channel assignments continues similarly in the other cells adjoining the central cell. It will be noted that the technique of separating each channel assigned to any cell from the next channel assigned to that cell allows a number of cells having entirely different frequencies to be positioned in a system before any frequency must be repeated. The pattern is often called a frequency reuse pattern and may vary in many ways.

In some systems, especially those with cells in urban areas carrying heavy traffic, each cell is further divided into three sectors each of which includes assignment of channels. The antennas of each sector are typically arranged to provide 120 degrees of coverage within the cell. With slightly over four hundred channels available, a repeating pattern may be achieved in a hexagonal arrangement, using seven cells that each have three sectors.

In theory, this form of cell arrangement and the channel assignment scheme allow the frequency reuse pattern to be repeated at distances sufficiently separated to minimize interference between mobile units.

Unfortunately, interference does occur for a number of reasons. Antenna patterns, power levels, scattering, and wave diffraction differ from cell to cell. Buildings, hills, mountains, foliage, and other physical objects cause the transmitted signal strength to vary over the region covered by a cell. Consequently, the boundaries at which the signal strength of a channel falls below a level sufficient to support communications with a mobile unit vary widely from cell to cell. For this reason, cells adjacent to one another do not, in fact, typically form the precise geometric boundaries suggested above and coverage gaps can occur. Since cell boundaries must overlap to provide complete coverage of an area and the boundaries of cells are imprecisely defined, overlapping coverage often occurs between channels. As a result, channels having an overlapping coverage area may interfere with each other.

The odd-shaped boundaries of the cells and the necessity that the cells have overlapping coverage areas increases the likelihood that multiple signals on the same channel will interfere with each other, even though they are generated by non-adjacent or widely separated cells. This is especially true when a sectored cell pattern is used because the cells are much closer to each other than in a simple cell pattern. A signal originating from a remote cell (sometimes referred to as an interferor I) may interfere with a second stronger signal carrying a mobile transmission (sometimes referred to as the carrier signal S), on the same channel, when the difference in signal strength between the two signals is less than some threshold level (typically measured in decibels as the S/I ratio). Moreover, signals on adjacent channels are carried by abutting cells in accordance with the above-described frequency reuse pattern. Typically, frequency filtering is insufficient to eliminate the reception of adjacent frequencies entirely. Consequently, there may be adjacent channel interference. A signal on an adjacent frequency may interfere with a communication link when the difference in signal strength between the two signals is less than some second, usually lower, threshold level. Normally an adjacent channel may have a signal strength closer to that of the communication link without causing significant interference because the frequency filtering of the receivers eliminates a substantial portion of the adjacent channel's signal strength.

In order to optimize coverage and to overcome interference when designing or reconfiguring the coverage of a mobile cellular system, a cellular system operator uses predictive software to determine what signal strength may be expected at locations throughout the cellular system from each of a particular set of cells. This software can utilize data describing the physical characteristics of the terrain surrounding each cellular site and the physical characteristics of the cellular station to plot predicted signal strengths around the cellular site. These signal strength predictions are then overlaid on a graphical plot to determine where antennas should be placed to provide optimum coverage, with appropriate overlapping areas for hand-offs. Once the antenna sites have been determined, the operator assigns channel groups to the cells in accordance with the technique described above.

SUMMARY OF THE INVENTION

It is common that coverage cannot be optimized and the expected interference among signals cannot be eliminated using predictive software alone. To discover the differences between the predicted system and realized system characteristics, it may be necessary to perform data collection to measure the signal strength of each sector at multiple points within the region of interest and compare these measurements with the predicted characteristics. Data collection can be accomplished by a number of methods which measure the signal strength of channels.

During the data collection to determine RF signal strengths, indication of RF signal strength at a plurality of locations throughout the system is collected. In one form of collection, referred to as a drive test, a mobile unit with a scanning receiver drives over the roads of the test region. The scanning receiver scans, receives, identifies and measures the strength of signals transmitted by the cells and/or sectors as the mobile unit moves throughout the system. For each measurement point, this provides a strength measurement of the signal generated by each cell. These strength signals are recorded for the cells and sectors from which they emanate. The collected data indicates RF coverage for the system. Also, by comparing the relative signal strengths of signals originating from different sectors and measured at a common point, it is possible to determine which sectors may potentially interfere with each other in the event they use a common or adjacent channel frequency. Thus, the effective coverage pattern may be used to optimize coverage and the actual interference points may be used to determine whether sufficient interference exists to change the channel group assigned to the particular area. The collected data can also be used for a number of other analysis or implementation applications. The present invention does not rely on any particular data collection nor is the present invention limited to particular analysis application. The present invention is a post-processing technique which can be widely applied to enhance network growth management.

If the geographic region of interference is sufficiently great, the channel assignment pattern for the system may be changed. That is, a frequency or a frequency group assigned to an antenna, a sector or a cell (or cells) is typically changed in its entirety to another non-interfering frequency group. Sometimes, interference may be eliminated by changing the cell characteristics (such as antenna tilt or power used in particular cells) without changing the channel assignment.

The present invention processes collected data after collection and prior to additional analysis. The present invention overcomes the problems of the prior art when designing or reconfiguring antenna gain patterns, directionality, orientation and selection, by using both measured and predicted signal level data for a system to characterize interference between cellular channels. The invention characterizes the expected interference based upon dynamic information corresponding to in-use performance. The method of the present invention also analyses and normalizes reception data to remove the effect of antenna directionality from the measured and modeled propagation profile of a cellular system. Moreover, the invention may be used to adaptively reassign radio frequency (RF) channels and power settings based upon the measured system performance and prospective parametric variations, to maximize capacity while minimizing overall interference within the system. The analysis method herein also allows for system expansion planning and for determination of optimum antenna gain pattern selection.

When collecting data for analysis and optimization of a wireless system, measured path loss data may be used as the foundation for analyzing cellular systems. Path loss is defined as the attenuation between a source antenna (sector) and a point on the terrain of the wireless system. The path loss is measured by subtracting the Received Signal Strength Indicator (RSSI) of a signal, at a location on the terrain, from a known transmitted signal level for the received signal.

The path loss equation may be expressed as:

$$\text{Path Loss [dB]} = P_{tx}[\text{dBm}] - RSSI[\text{dBm}]$$

where, $P_{tx}$ is the transmitted power

RSSI values can be obtained at various locations of a cellular system by any desired method or means.

Once data has been collected, it is post processed. The post processing involves associating each measurement with a sector transmission so that the path loss may be calculated. The association includes matching a measured RF channel with an RF channel used in a sector. The path loss calculation requires knowledge of at least one reference RF channel used in a sector and its transmit power.

To completely analyze a cellular system, it is necessary to have path loss information, at each measurement location, for sectors that may serve and sectors that may interfere at the particular location. For example, if a system requires a Signal to Interference ratio (S/I) of 20 dB for interference-free communication, the collection must obtain measurements of sector signals that are discernable at the location and have RSSI power levels within 20 dB of the serving signal level. With this information, it is possible to automate optimization tasks, such as determining frequency and power assignments that provide a desired quality of service.

In reality, it is not always possible to acquire measured path loss information at every potential measurement point. Therefore, the present invention can augment the acquirable measured path loss information with predicted path loss information obtained using a propagation model. A linear regression analysis can also be applied to the preliminary results provided by the propagation model to better match the propagation model to the realized cellular system. Other techniques such as geostatistical analysis can also be used, as can interactive interpolation of weighted measured and propagation data. Once the propagation model is refined, the expected path loss information produced by the model is integrated with the measured information. Thereafter, the combined information may be used to improve or model the performance of the cellular system.

As described above, the path loss is measured by subtracting the Received Signal Strength Indicator (RSSI) of a signal, at a location on the terrain, from a known transmitted signal level for the received signal and may be expressed by the equation:

$$\text{Path Loss [dB]} = P_{tx}[\text{dBm}] - RSSI[\text{dBm}],$$

where $P_{tx}$ is the transmitted power

Since $P_{tx}$ is the transmitted power radiated by the transmission antenna, the path loss equation expressed above does not provide the propagation path loss. Instead, the equation provides the combined path loss for the RF link comprising the transmission antenna and the propagation medium, assuming the loss of the receiver system has been factored into the value for RSSI. The propagation path loss may be obtained from the above-described equation by factoring out the gain provided by the transmission antenna. Once the antenna gain is removed from the path loss calculation for the RF link, the resulting propagation path loss value may be used to model the propagation characteristics of a signal communicated between the transmit and receive points without regard to the gain or beam pattern of the transmission antenna.

An embodiment of the invention is a process for optimizing the performance of a wireless communication system, employing a number of techniques for determining improved antenna distribution and orientation, including: identifying a drive test region; measuring a signal from each of a plurality of sectors of a plurality of cell sites for the drive test region, to determine the receive power of the measured signals; removing the effective antenna gain associated with each of the measured signals to normalize each of the measured signals to a conceptual antenna having an isotropic radiation pattern; correlating each of the measured signals with the corresponding modeled conceptual signal; revising the propagation model, based on the correlation between each measured signal with the corresponding modeled conceptual signal, to create a revised propagation model that better predicts an expected path loss of the conceptual signal; applying the revised propagation model to the conceptual signal from each sector of the plurality of sectors to determine the predicted path loss to a number of additional non-overlapping spatial bins; planning antenna variations, changes and substitutions based on the conceptual model to enhance coverage through increased effective use of directional antennas, antenna gain patterns and antenna orientation; applying the revised propagation model to a planned signal from each sector of a planned plurality of sectors to determine the expected path loss of the planned signal to each of the plurality of bins; and/or repeating the steps a number of times to improve a co-channel signal-to-noise ratio for the planned signal in each of the bins.

The present invention can utilize a database containing antenna specification data corresponding to the antennae deployed throughout the system to remove antenna effects to normalize data. The data base can contain additional information about other antennae so that the system can implement a plurality of propagation analysis through substitution of antennae with known properties into cell site locations to determine enhanced system coverage.

DETAILED DESCRIPTION OF THE INVENTION

Figure 1:
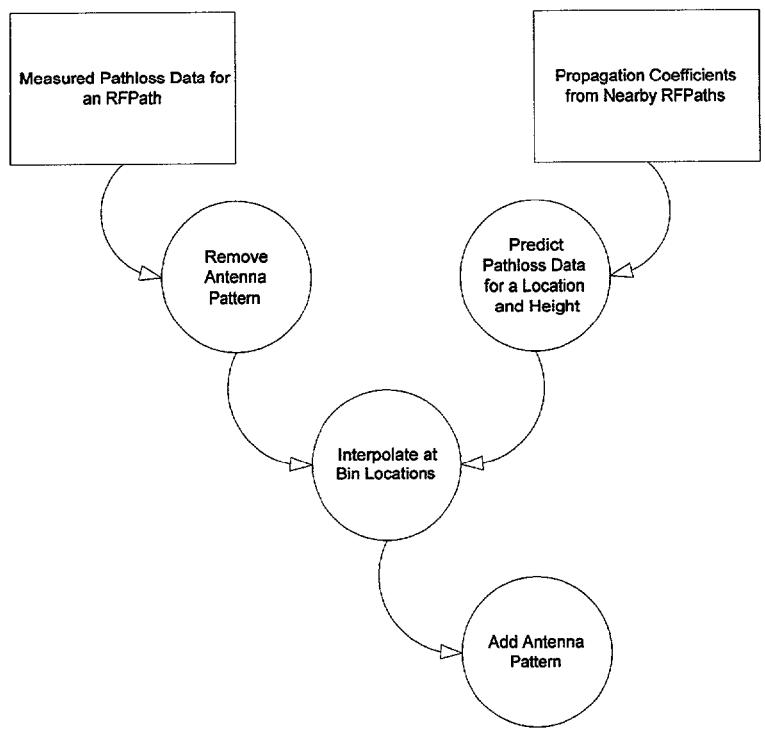
FIGS. 1 through 3 are logical flow diagrams illustrating the overall flow of the process of the present invention.

This section defines the nomenclature used in this specification. The following properties of a cellular system refer to a set of attributes that describe some physical characteristic of the system.

Location—the set of attributes describing a cell site's position on the earth.

RFMount—the set of attributes describing the position of an antenna above some point on the earth.

RFPath—the set of attributes describing the directional mounting of an antenna at an RFMount. More specifically, the physical information needed to determine how the cell site antenna focuses energy over a geographical area.

Pathloss Point—the set of attributes describing the pathloss value and associated geographic information for a particular point in space.

When one of these properties is referenced in the specification, the set of attributes defining this property is being referenced, also. The set of attributes associated with each property are summarized in Table 1.

TABLE 1

| Attributes | Location | RFMount | RFPath | Pathloss Point |
|---|---|---|---|---|
| Longitude | X | X | X | X |
| Latitude | X | X | X | X |
| Elevation | X | X | X | X |
| Radiation Center | | X | X | |
| Orientation | | | X | |
| Electrical Tilt | | | X | |
| Mechanical Tilt | | | X | |
| Antenna | | | X | |
| Path Loss | | | | X |
| Variance | | | | X |

The attributes listed in Table 1 have the following meanings in this specification, however, the physical characteristics of a cellular system may vary greatly from the exemplary system described herein without departing form the scope of the invention.

Longitude: Earth coordinate position in centiseconds. Positive for the Eastern hemisphere.

Latitude: Earth coordinate position in centiseconds. Positive for the northern hemisphere.

Elevation: Height from mean sea level to ground level in meters.

Radiation Center: Height from the ground to the center of an antenna in meters. Sometimes abbreviated as radctr.

Orientation: Physical direction of an antenna in the horizontal plane of the earth. Units are degrees with respect to true north. Orientation increases clockwise from north.

Mechanical Tilt: Physical direction of an antenna in the vertical plane of the earth. Units are degrees with respect to the horizon. Tilt has a positive value for an angle below the horizon and a negative value for an angle above the horizon. This parameter is sometimes abbreviated as mtilt.

Electrical Tilt: Shift in the main lobe of the antenna pattern in the vertical plane of the earth. Units for electrical tilt are in degrees and follow the same representation as mechanical tilt. This parameter is sometimes abbreviated as etilt.

Antenna: This is a reference to a set of attributes describing the characteristics of an antenna.

Pathloss: The difference in signal level, in dB, between transmit power and receive power.

Variance: The range in ±dB about the recorded pathloss value, an actual measured value may vary for a given confidence level.

The invention generates predicted pathloss values from normalized measured pathloss values, producing a set of data for an analysis of differing antenna gain configurations. The process for creating predicted pathloss values and generating interference patterns for a variety of antenna specifications allows for enhanced cellular system coverage.

The overall process of the system of the present invention is illustrated in FIG. 1. A cellular system analysis program, capable of executing the inventive method described herein, is executed by a computer to evaluate the qualitative and quantitative aspects of a cellular system. When the analysis program requests data for an RFPath, both measured and predicted values are merged by an interpolation process to produce binned pathloss values. The interpolation process uses pathloss values containing no antenna effects. The antenna effects are absent either because they have been removed from the measured pathloss values or because they were not initially added to the predicted pathloss values. When the gain characteristics of the RFPath's antenna are needed in the system analysis, they are additively incorporated into the binned pathloss values.

An RFMount concept is introduced by this invention and is used to describe the attributes of all RFPaths originating at the same location and height, with their respective antenna effects omitted. Measured RFPath data is converted to RFMount data by removing the gain provided by the antenna pattern. Predicted data is generated for an RFMount using the gain characteristic of an isotropic radiation source in the propagation model. After both types of RFMount information are developed, they are combined by an interpolation process to produce binned RFMount data.

Figure 2:
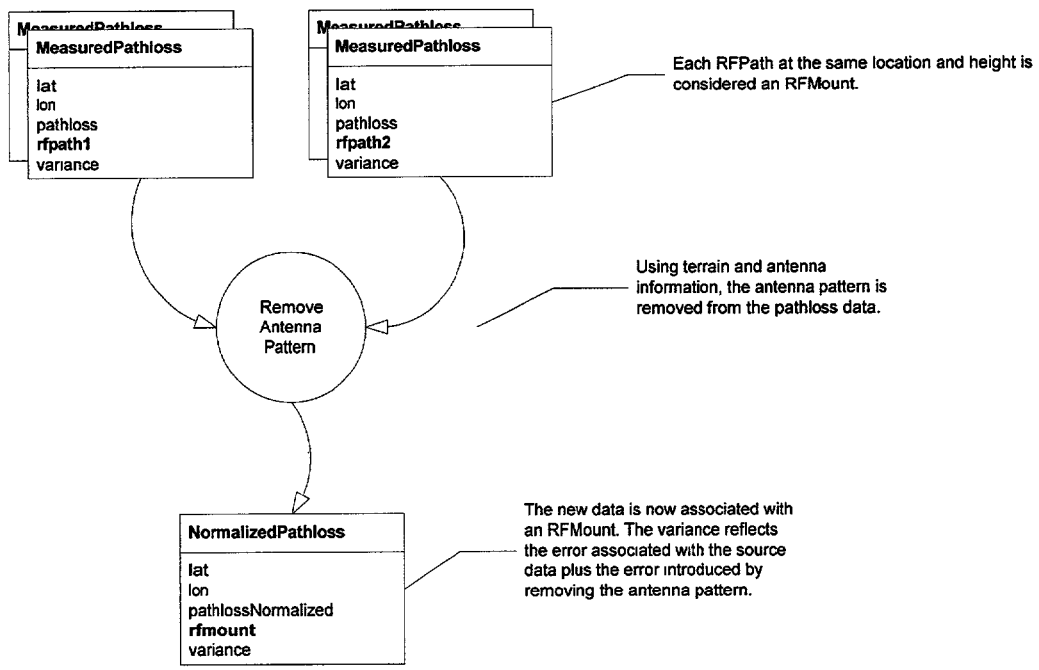

The process of removing the antenna gain from measured data converts RFPath pathloss data to RFMount pathloss data by making an adjustment to the calculated pathloss value. The overall flow of this process is illustrated in FIG. 2. This permits the grouping of data by an RFMount, which is more easily combined with predicted data, and more easily adjusted when small changes to RFPath configurations occur. The process used to negate the effect of an antenna gain from a measured RFPath pathloss value is also used to quantify the environmental propagation characteristics of the RFPath and modify the variance attribute of the pathloss value in accordance with the propagation characteristics.

Predicted pathloss data is generated for an RFMount using a propagation model. The resulting values are easily merged with measured RFMount data by considering the relative variance value of the sources. Predicted values are generated using factors derived from measured values of nearby RFPaths. Each value either measured or predicted has an associated variance value which reflects the confidence in the value. Measured values are generally assigned greater confidence than predicted values. The confidence of a measured value can vary depending on the distance between the measured location and the antennae cell and dependant on the orientation of the antennae as well as other factors.

Figure 3:
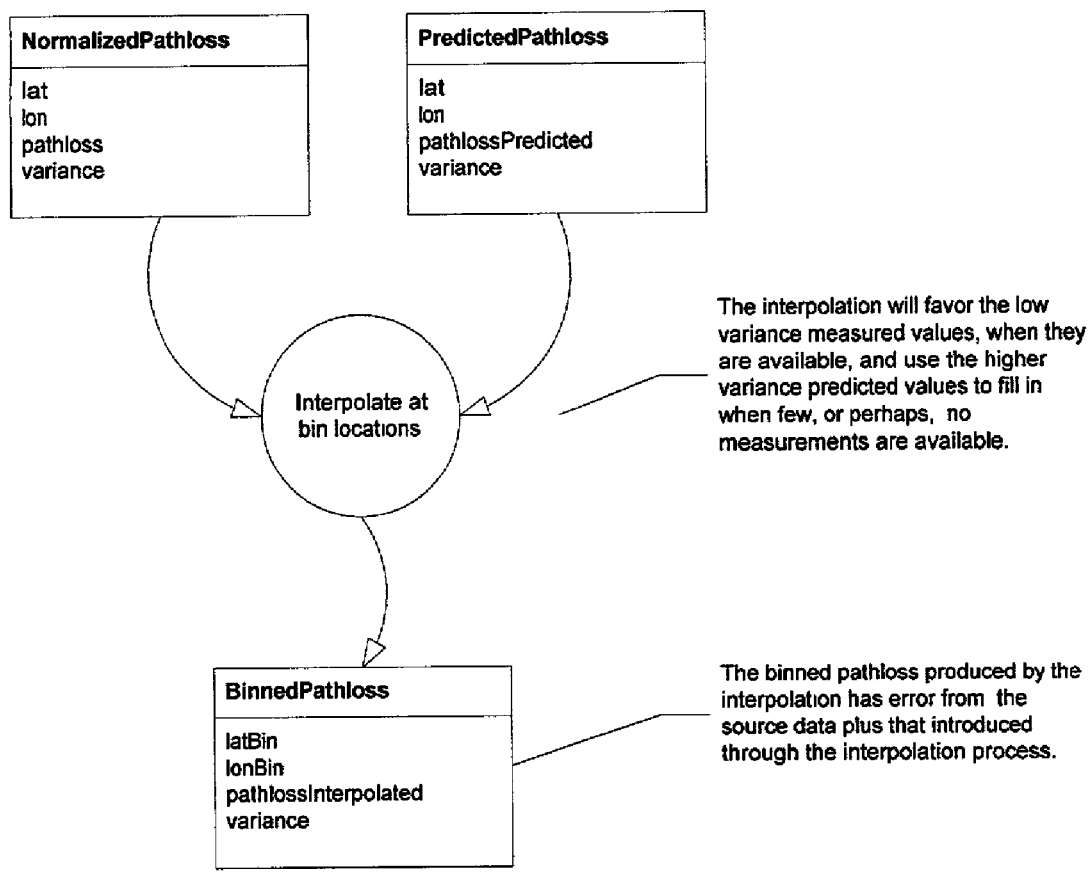

It is difficult to determine the relative numbers of measured and predicted pathloss values that may be required to accurately characterize a particular region of a cellular system. For this reason, variance attributes are attached to each pathloss value. The interplay of confidence of predicted and measured data is illustrated in FIG. 3. A relatively high variance value is assigned to predicted pathloss values and a relatively low variance is assigned to measured pathloss values because of the greater confidence in measured data over predicted data. Since the interpolation can ignore high-variance predicted values when enough measured data is available in an area, it can be preferred to include the predicted values and let the interpolation process decide whether to use them. Therefore, pathloss interpolation can accommodate both measured values and predicted values, allowing variance to guide the interpolation algorithm in choosing and weighting the significance of the source data.

The variance assigned to measured data will be influenced by the confidence in the antenna manufacturing specifications. Antenna specifications have greater accuracy in the main frontal lobes than in ancillary side or back lobes, which can be greatly affected by antenna mounting. When the antenna gain pattern is removed in the present invention post-processing of the collected data, the inaccuracy can be compounded by the antenna confidence factor especially in side or back lobes. Therefore, the variance of measured values can vary due to antenna variance factors.

To better understand the purpose and means for negating the effects of antenna gain for each binned pathloss value, this section identifies the attributes that describe an antenna. Of primary interest are the attributes describing the electrical properties. The electrical properties are supplied by the antenna manufacturer and identify the antenna's ability to focus RF energy in three dimensions. This information is defined by the maximum gain and two sets of gain offset values surrounding the antenna. The gain offset values identify the difference in maximum gain for points along the horizontal and vertical planes, forming a horizontal and vertical gain (offset) patterns.

The gain pattern is represented by an array of 360 gain offset values having units of decibels (dB). A gain offset value represents the difference in gain from the maximum gain point of the antenna to some gain pattern point associated with an angle in degrees {0° . . . 359°} from the boresight of the antenna. Therefore, the gain offset value is zero for the horizontal and vertical gain patterns at the maximum gain point of the antenna and must be negative or zero for all other points of the gain pattern.

Figure 4:
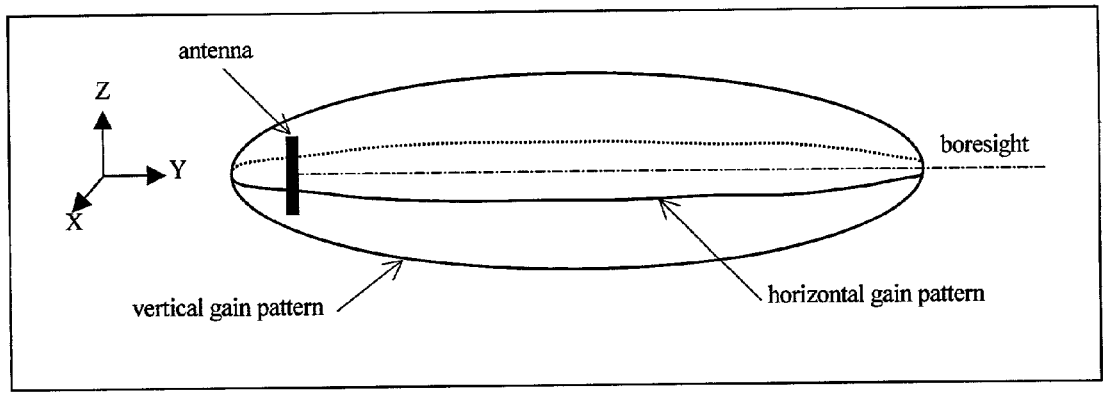
FIG. 4 illustrates a representative three-dimensional gain pattern.

The antenna's boresight refers to the physical direction (aim) of the antenna. The boresight corresponds to the angles 0°, 0° in the horizontal and vertical planes. Note that the boresight is not necessarily the point of maximum gain on the gain pattern. A gain pattern is a complex three-dimensional shape. To represent this shape, the manufacturer provides a cross section of the gain pattern in the horizontal and vertical planes. The three-dimensional gain pattern can be constructed by combining these horizontal and vertical cross sections. FIG. 4 depicts a three dimensional gain pattern for a simplified antenna pattern.

Figure 5:
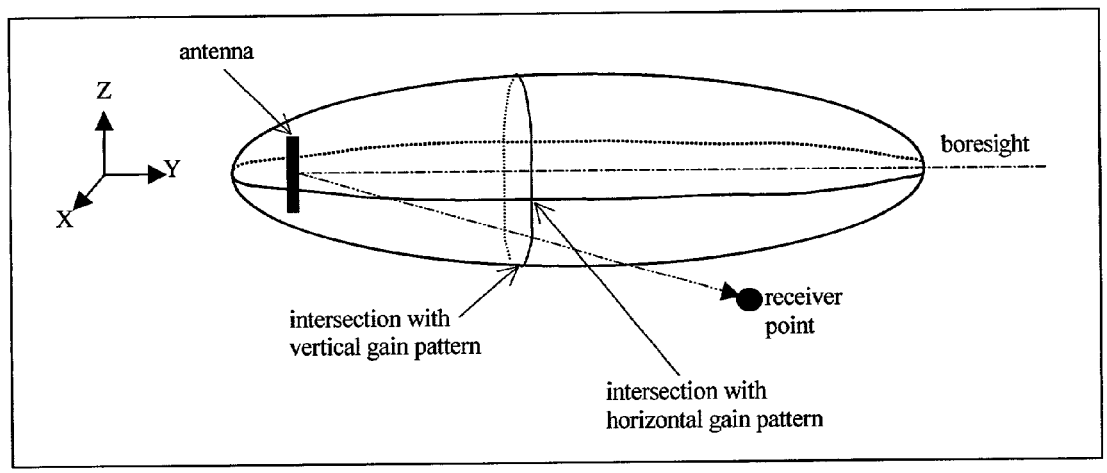
FIG. 5 illustrates a receiver point located of the horizontal and vertical planes of the gain pattern shown in FIG. 4.

The gain offset for a receiver point in space is determined by the angle between the antenna and a receiver point. When the receiver point is located on the vertical or horizontal planes, the gain offset is obtained by calculating the angle on the respective gain pattern and retrieving the gain offset value. In most cases, the receiver point is not located on these planes, so an interpolation is required to determine the gain offset. FIG. 5 illustrates a receiver point located off the horizontal and vertical planes.

Figure 6:
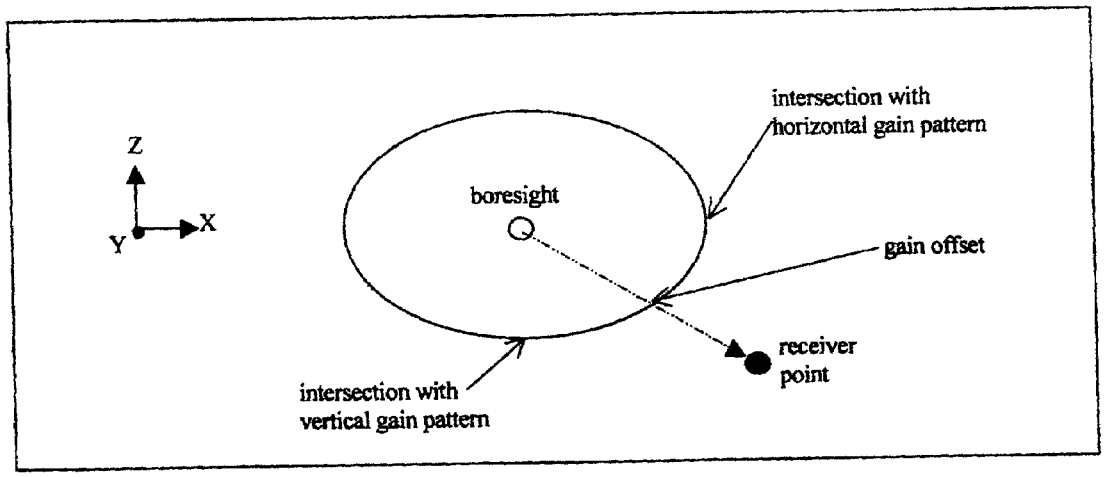
FIG. 6 illustrates a plane orthogonal to the boresight containing the ellipse formed by horizontal and vertical plane intersection points for the receiver.

To interpolate the gain offset for a receiver point in space, a line is constructed from the antenna to the receiver point. Next, the intersection points of this line with the horizontal and vertical gain patterns are determined. The gain offset values form two points on an elliptical curve joining the intersection points and the plane of this elliptical curve is orthogonal to the boresight of the antenna, as illustrated in FIG. 6.

The antenna gain associated with the RFPath pathloss to the binned receiver point, is determined by the following steps of:

1) calculating the horizontal angle between the binned receiver point and the antenna to determine the horizontal gain offset;

2) calculating the vertical angle between the binned receiver point and the antenna to determine the vertical gain offset;

3) calculating the angle between the binned receiver point and the antenna, on the plane orthogonal to the boresight, to interpolate the spatial gain offset; and 4) calculating the antenna gain by subtracting the spatial gain offset from the maximum antenna gain.

Figure 7:
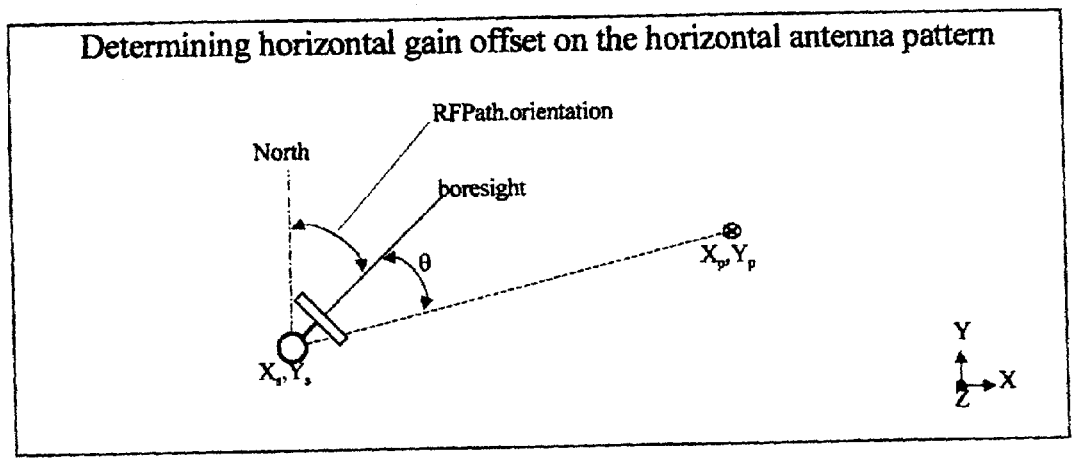
FIG. 7 illustrates a graphical means for determining the angle in the horizontal plane between the antenna boresight and the receiver point.

Referring now to FIG. 7, to determine the horizontal gain offset from the horizontal antenna pattern, the angle $\theta$ between the antenna boresight and the binned receiver point must first be determined. In practice, this requires calculating the angle from true north to the binned receiver point and then subtracting from this angle the angle between true north and the boresight orientation. These calculations are performed in the following way. The angle between the binned receiver point and true north is given by $a\tan(dX/dY)$, where $dX=X_p-X_s$, $dY=Y_p-Y_s$, $X_p$ and $Y_s$ are the planar coordinates of the binned receiver point, and $X_s$ and $Y_s$, are the planar coordinates of the source antenna. Angle $\theta$ may be determined from the equation:

$$\theta=a\tan(dX/dY)-RFPath.\text{orientation},$$

where RFPath.orientation is the angle between the antenna boresight and true north. With $\theta$ known, the antenna's horizontal gain offset, $G_{ant,hor}[\theta]$, may be obtained by examination of the antenna's horizontal gain pattern.

Figure 8A:
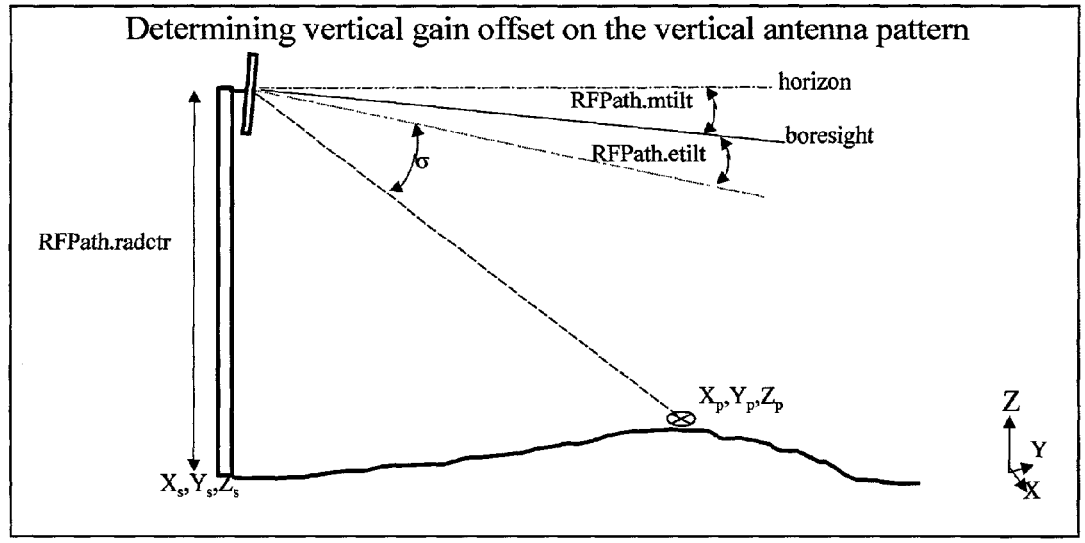
FIG. 8A and 8B illustrate a graphical means for determining the angle in the vertical plane between the antenna's effective boresight and the receiver point.
Figure 8B:
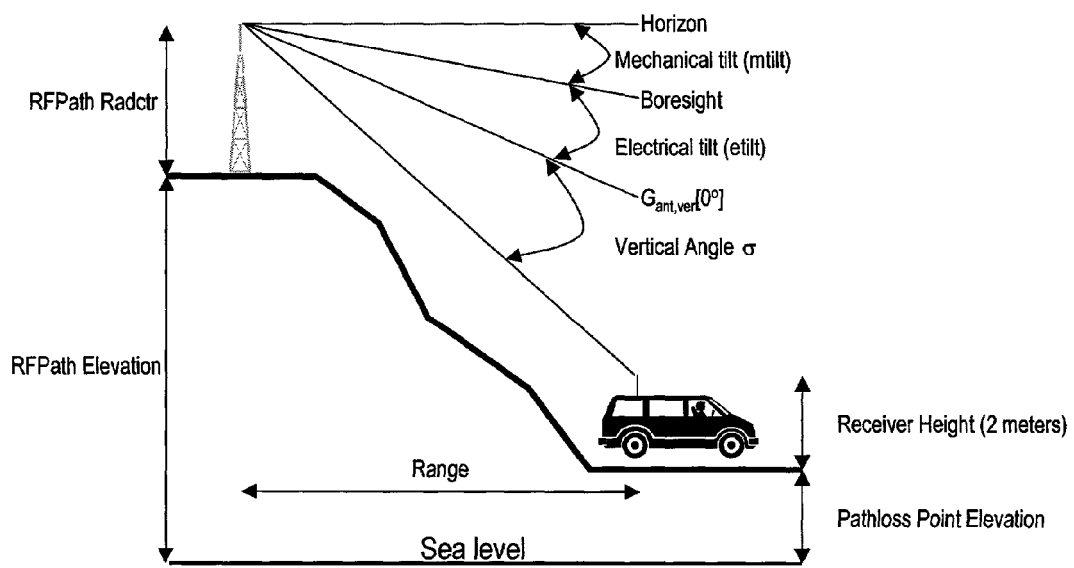

Referring now to FIGS. 8A and 8B, to determine the vertical gain offset from the vertical antenna pattern, the angle $\sigma$ between the antenna's effective boresight and the binned receiver point must first be determined. In practice, this requires calculating the angle between the RFPath horizon and the path loss data point, and subtracting from this value the RFPath mechanical and electrical tilt angles (i.e., the effective boresight angle). These calculations are performed in accordance with the following equations:

$$dZ=Z_p-(Z_s+RFPath.\text{radctr})$$

$$dX=X_p-X_s$$

$$dY=Y_p-Y_s$$

$$\text{dist}=(dX^2+dY^2)^{1/2}$$

$$\sigma=a\tan(-dZ/\text{dist})-(RFPath.\text{etilt}+RFPath.\text{mtilt})$$

where, $X_p$, $Y_p$, and $Z_p$ are the coordinates of the binned receiver point;

$X_s$, $Y_s$, and $Z_s$ are the coordinates of the source antenna;

RFPath.etilt is the angle of electrical tilt forming the angle between the effective boresight and the actual boresight; and RFPath.mtilt is the angle between the horizon and the actual boresight.

Figure 10:
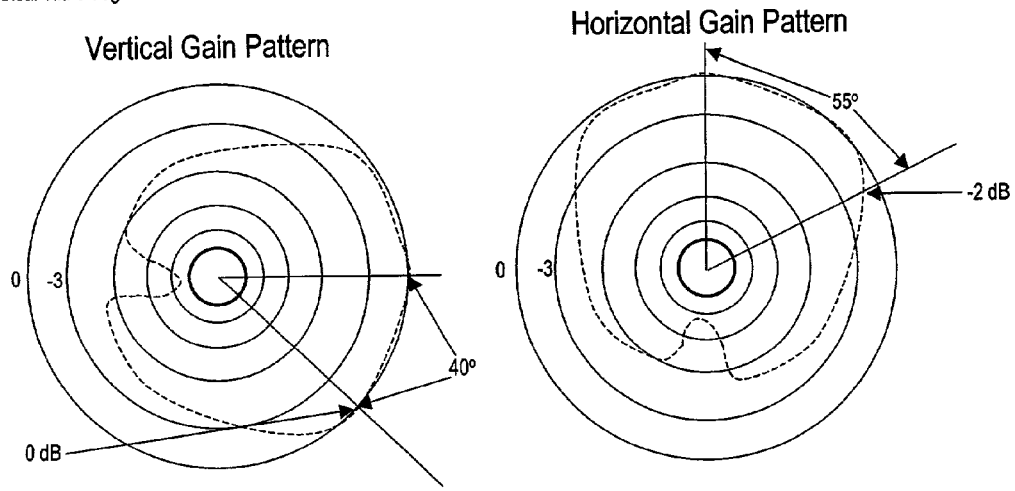
FIG. 10 illustrates typical antenna specification data.

With $\sigma$ known, the antenna's vertical gain offset, $G_{ant,ver}[\sigma]$, may be obtained by examination of the antenna's vertical gain pattern. The horizontal and vertical gains pattern is stored in a database which has information on each of the antennae deployed in the system. The database can also have information on a number of alternative antennae for use later in the process for proposed antennae substitutions. FIG. 10 is an illustrative example of a typical antenna pattern data. Although the determination of $G_{ant,ver}[\sigma]$ must consider whether the binned receiver point is in front of or behind the antenna, this consideration has been omitted for clarity of discussion. One of ordinary skill in the art would understand how to incorporate the consideration of whether the binned receiver point is in front of or behind the antenna.

Figure 9:
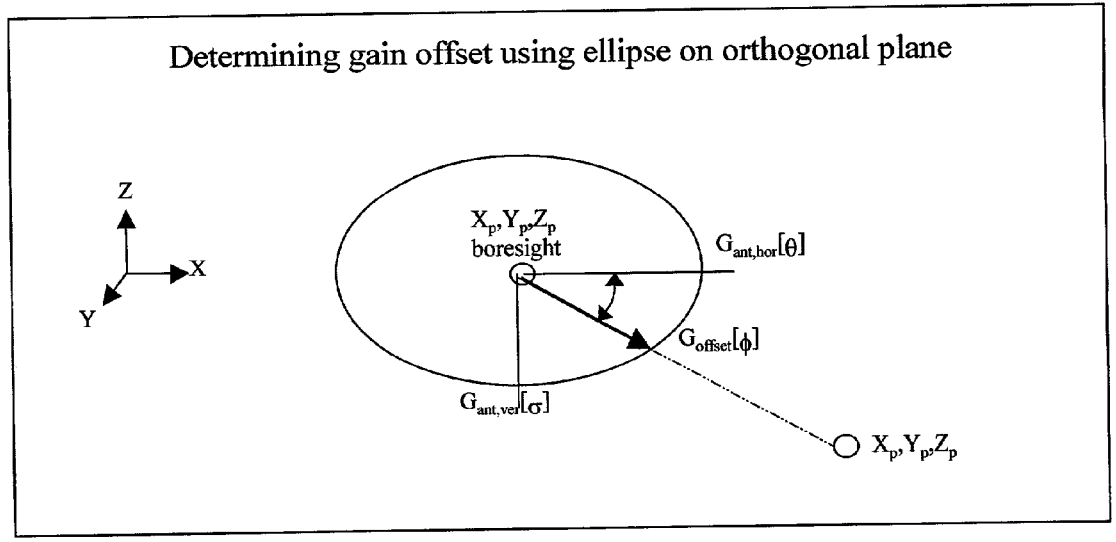
FIG. 9 illustrates a graphical means for determining the angle of intersection between the ellipse of FIG. 5 and a radial drawn from the boresight to the receiver point.

After ascertaining the horizontal and vertical gain offset values, an elliptical approximation is used to interpolate the gain offset. To perform this interpolation, it is necessary to calculate the angle, $\phi$, from the antenna boresight to the path loss data point. FIG. 9 illustrates this angle in the plane lying orthogonal to the boresight and containing the ellipse.

The equations to calculate the angle $\phi$ are as follows:

$$dZ=\sin(\sigma);$$

$$dR=\sin(\theta);$$

and $$\phi=a\tan(dZ/dR).$$

Calculating the gain offset requires solving for the radius of the ellipse at the angle $\phi$. The equation for an ellipse is:

$$((i/a)^2+(j/b)^2)^{1/2}=1$$

Substituting:

$$i=r*\sin(\phi)$$

$$j=r*\cos(\phi)$$

provides the equation:

$$((r*\cos(\phi)/a)^2+(r)*\sin(\phi)/b)^2)^{1/2}=1$$

Solving for r:

$$r=((\cos(\phi)/a)^2+(\sin(\phi)/b)^2)^{-1/2}$$

and substituting:

$$a=G_{ant,hor}[\theta]$$

$$b=G_{ant,ver}[\sigma]$$

provides the equation:

$$G_{offset}[\phi]=((\cos(\phi)/G_{ant,hor}[\theta])^2+(\sin(\phi)/G_{ant,ver}[\sigma])^2)^{-1/2}$$

Finally, the antenna gain is calculated as:

$$G_{ant}[\phi]=G_{ant,max}-G_{offset}[\phi]$$

When including the effects of an antenna in the pathloss value, we subtract the antenna gain from the path loss data point;

$$PL_{new} = PL_{original} - G_{ant}$$

When removing the effects of an antenna in the pathloss value, we add the antenna gain to the path loss data point, as described in the equation:

$$PL_{new} = PL_{original} + G_{ant}$$

In both cases, the pathloss has a positive value.

Variance is additive since the antenna pattern variance is independent of the path loss data point variance. Therefore, the variance of the antenna pattern is added to the variance of the path loss data point. The process for calculating the antenna variance uses the same procedure as calculating the gain offset. In particular, the process has the steps:

1) Calculate $VAR_{ant,hor}[\theta]$;
2) Calculate $VAR_{ant,ver}[\sigma]$;
3) Calculate $VAR_{ant}[\phi]$; and
4) $VAR_{new} = VAR_{original} + VAR_{ant}[\phi]$.

Path Loss Data Normalization (PLDN) provides the ability to add or remove the effects of an antenna from a set of path loss data. This process involves offsetting the path loss value, for each path loss data point, with the antenna gain relative to each path loss data point location. In addition, the variance associated with each path loss data point may be adjusted by the variance associated with the corresponding point on the antenna pattern.

At a typical cellular tower, there are three sectors that are each served by a different transmit antenna. Each antenna forms a unique RFPath. Measured pathloss data is recorded separately for each RFPath. In order to combine the data from all three RFPaths into a single data set, it is necessary to normalize the data by removing the antenna effects from each pathloss point measurement.

RFPath data is translated to RFMount data for several reasons:

1) to combine measured data from multiple RFPaths into a single RFPath.
2) to combine measured data with modeled data; and
3) to model new RFPaths for an existing RFMount.

PLDN is initialized by submitting a desired RFPath. PLDN works with a single pathloss point at, a time. Each pathloss point is submitted individually for processing by the computer. Using the procedures described above, the horizontal and vertical offset angles, $\{\theta, \sigma\}$, to the pathloss point are calculated. Next, the horizontal and vertical offset gain values are retrieved from an antenna database. The antenna database contains the same offset gain information as the horizontal and vertical gain pattern graphs, but in the database the antenna values will be loaded numerically in one-degree increments. The horizontal and vertical gain offsets are used to interpolate the gain, $G_{ant}[\phi]$, of the antenna at some angle (p in three dimensional space, where $\phi$-a $\tan(\sin(\sigma)/\sin(\theta))$. Once the offset gain is calculated, the RFMount pathloss value may be calculated.

For example, suppose the RFPath pathloss for a pathloss point is derived from a measurement at the point and found to have a value of 102 dB. Further suppose that the RFPath antenna gain, $G_{ant}[\phi]$, for the relevant value of angle $\phi$ has a value of 5.2 dB. The RFMount pathloss is calculated as the sum of the RFPath pathloss and the RFPath antenna gain and has a value of 107.2 dB. Although the gain of the antenna does not, in fact, affect the pathloss of a propagation link in any way, summing the RFPath pathloss with the antenna gain provides a convenient way to characterize the propagation loss of an RF link. This propagation loss is characterized as though the RF transmission originated from an isotropic radiator and is commonly referred to as the free space loss. The RFPath pathloss contains the propagation effects of both the free space loss and the antenna gain. Translating RFMount data to RFPath data simply reverses the process described above.

The gain patterns provided by a manufacturer represent the theoretical gain performance of an antenna model. These gain patterns are normally measured in a lab environment under controlled conditions.

When an antenna is deployed at a cell site, the actual gain pattern is affected by mounting conditions, near field objects, and frequency. These effects cause the actual gain pattern to differ from the theoretical gain pattern reported by the manufacturer. In particular, the gain pattern outside the main beam of the antenna (side lobes) is most likely to be different in the real environment. Within the main beam of the antenna, the gain pattern typically remains consistent with the theoretical gain pattern.

The variance pattern identifies the confidence associated with the gain pattern. This variance can be included when adding or removing the gain pattern from a set of pathloss data points, thus incorporating the confidence of the gain pattern in the data. The variance pattern is represented by an array of 360 decimal values in dB corresponding with the horizontal and vertical gain patterns.

Variance is additive, since the antenna pattern variance is independent of the pathloss point variance, and is calculated from the equation:

$$VAR_{new} = VAR_{original} + VAR_{ant}[\theta, \sigma]$$

where, $VAR_{ant}[\theta, \sigma]$=variance value in the direction of the pathloss point using elliptical approximation not separate variance for horizontal and vertical antennae patterns Since variance increases with each PLDN translation, it will be important to use the minimum number of translations to model a particular RFPath or RFMount. For example, if ten different RFPaths are modeled for the same RFMount, then the original measured data should be used as the input for all ten models rather than using the output of each model as the input to the succeeding model.

The propagation model calculates pathloss between an RFMount and a pathloss point. A number of different propagation models have been developed to capture different propagation effects. Since all the factors that influence pathloss can not be modeled, a calculated value can only estimate the pathloss within a statistical variance. One generic propagation model has the form:

$$PL_{RFMount} = w_0(c_0 - c_1 \log_{10}(h)) + w_1(c_2 - c_3 \log_{10}(h) \log_{10}(r)) + w_2(\text{diffraction}) + w_3(\text{local effects})$$

where, h is the effective height of the RFMount in meters;

r is the distance between the RFMount and the pathloss point in meters;

$c_0$, $c_1$, $c_2$, and $c_3$ are constants;

diffraction is the diffraction component;

local effects is a correction factor to adjust for local terrain type; and $w_0$, $w_1$, $w_2$, and $w_3$ are weighting factors, having a default value of one.

In the free space pathloss model:

$c_0 = 32.4 + 20 \log_{10}(\text{frequency}) - 60;$ $c_1 = 0;$ $c_2 = 20;$ $c_3 = 0;$ and $\text{pathloss} = 32.4 + 20 \log_{10}(\text{frequency}) + 20 \log_{10}(r) - 60$ In the Okamura-Hata pathloss model:

$c_0 = 69.55 + 26.16 \log_{10}(\text{frequency});$ $c_1 = 13.82;$ $c_2 = 44.9;$ $c_3 = 6.55;$ and $\text{pathloss} = 69.55 + 26.16 \log_{10}(\text{frequency}) - 13.82 \log_{10}(h) + (44.9 - 6.55 \log_{10}(h)) \log_{10}(r)$ The generic equation can be expanded as follows:

$PL_{RFMount} = w_0 c_0 + w_1 c_2 - w_0 c_1 \log_{10}(h) + w_1 c_3 \log_{10}(h) \log_{10}(r) + w_2(\text{diffraction}) + w_3(\text{local effects})$ Combining common terms provides the equation:

$PL_{RFMount} = b_0 + b_1 \log_{10}(h) + b_2 \log_{10}(h) \log_{10}(r) + b_3(\text{diffraction}) + b_4(\text{local effects})$ where;
$b_0 = w_0 c_0 + w_1 c_2;$
$b_1 = -w_0 c_1;$
$b_2 = -w_1 c_3;$
$b_3 = w_2;$ and
$b_4 = w_3.$ In this final form of the generic equation, $b_0$ through $b_4$ are the pathloss coefficients.

Pathloss data generation can be performed for a single pathloss point or a series of pathloss points, if the locations of the pathloss points are already known. One application of the generation process is used for pathloss coefficient generation, when modeled pathloss values must be calculated for each measured pathloss point used in the coefficients regression.

To perform pathloss data generation, information concerning the following features is required for each pathloss point:
RFMount;
Receiver Height (meters);
Signal Frequency (MHZ);
Propagation Coefficents ($b_0$–$b_4$); and
pathloss Variance (dB).

The propagation coefficients and pathloss variance are calculated during the generation of pathloss coefficients. During initial modeling, all coefficient values are set to one. Diffraction values are calculated for segmented areas, as described later.

Pathloss data generation can be used to calculate pathloss for new pathloss points that are uniformly distributed along a ray, or for multiple rays uniformly distributed within an azimuthal angle. To perform the pathloss data generation using the designated radials method, the following information is required:
RFMount;
Receiver height (float meters);
Signal frequency (float MHZ);
Propagation coefficients (float $b_0$–$b_4$);
Pathloss variance (float dB);
Number of radials (int);
Radial length (int meters);
Step size along radial (int meters);
Starting azimuth (int degrees); and
Inscribed arc angle (int degrees).

Figure 11:
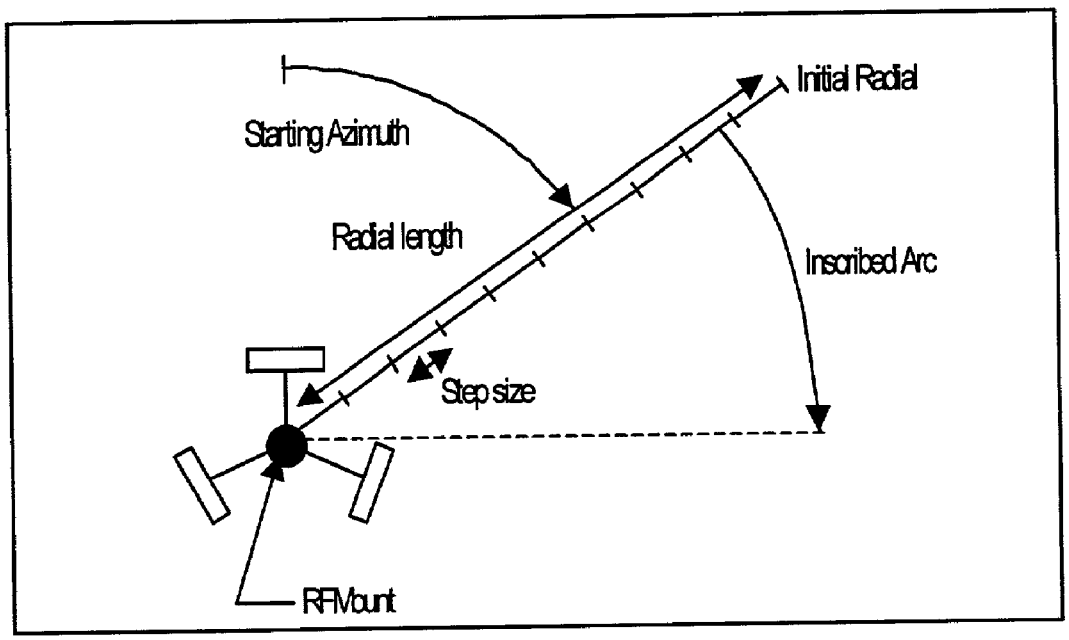
FIG. 11 illustrates the parameters used to calculate pathloss values for new pathloss points along a ray using the designated radials method.

FIG. 11 provides a graphical display of the input parameters. An initial radial is constucted using the radial length and azimuth values. Pathloss point locations along the radial are determined using the step size value. Each pathloss point location along the radial is translated into a latitude and longitude. Elevation is extracted from the terrain database. Propagation and diffraction losses are sequentially calculated for each pathloss point.

The orientation of the second and succeeding radials are calculated by dividing the inscribed are angle by the number of radials, and adding this value to the previous radial's oriention.

Figure 12:
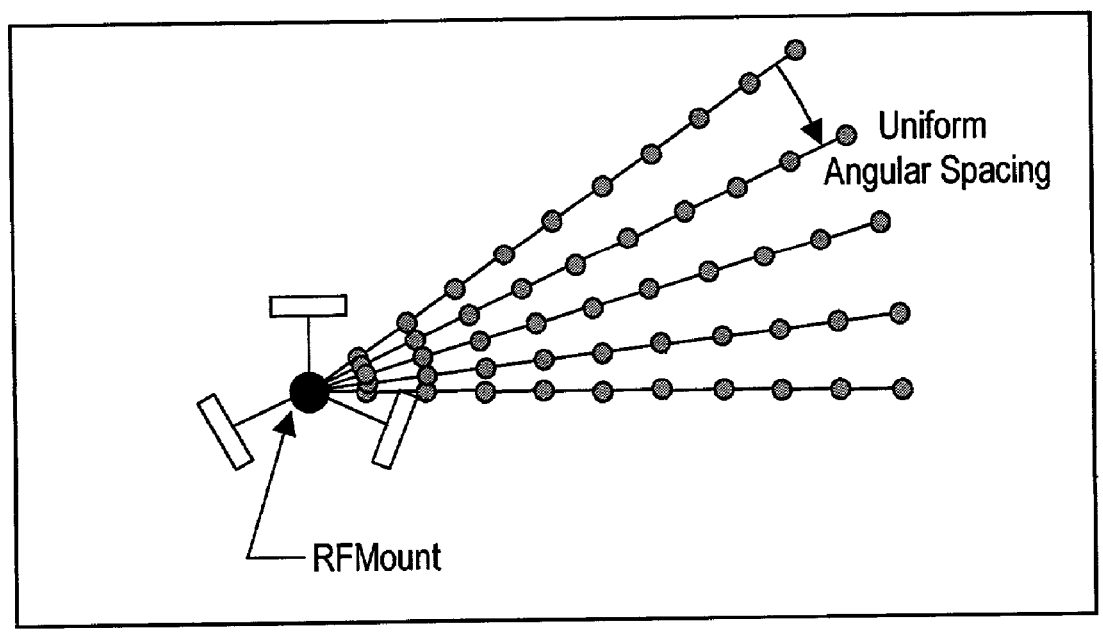
FIG. 12 illustrates the created pathloss points uniformly distributed along numerous radials of an inscribed arc using the designated radials method.

FIG. 12 shows the resulting output. Pathloss points are uniformly distributed along each radial and the radials are uniformly distributed within the inscribed arc.

Note that there are three variables that describe a radial: total length, step size, and number of steps. There are three variables that describe the inscribed arc: total arc span, angular spacing, and number of radials. As shown in the following table, these values may be expressed in nine different ways to describe the same distribution of pathloss points.

| | Radial Description | | Inscribed Arc Description | |
|---|---|---|---|---|
| 1 | total length | step size | total arc span | no. of radial |
| 2 | total length | step size | total arc span | angular spacing |
| 3 | total length | step size | no. of radial | angular spacing |
| 4 | total length | no. of steps | total arc span | no. of radial |
| 5 | total length | no. of steps | total arc span | angular spacing |
| 6 | total length | no. of steps | no. of radial | angular spacing |
| 7 | step size | no. of steps | total arc span | no. of radial |
| 8 | step size | no. of steps | total arc span | angular spacing |
| 9 | step size | no. of steps | no. of radial | angular spacing |

A preferred embodiment of the invention uses the first set of inputs to describe the distribution of pathloss points. Other input sets can be implemented, as well.

Figure 13:
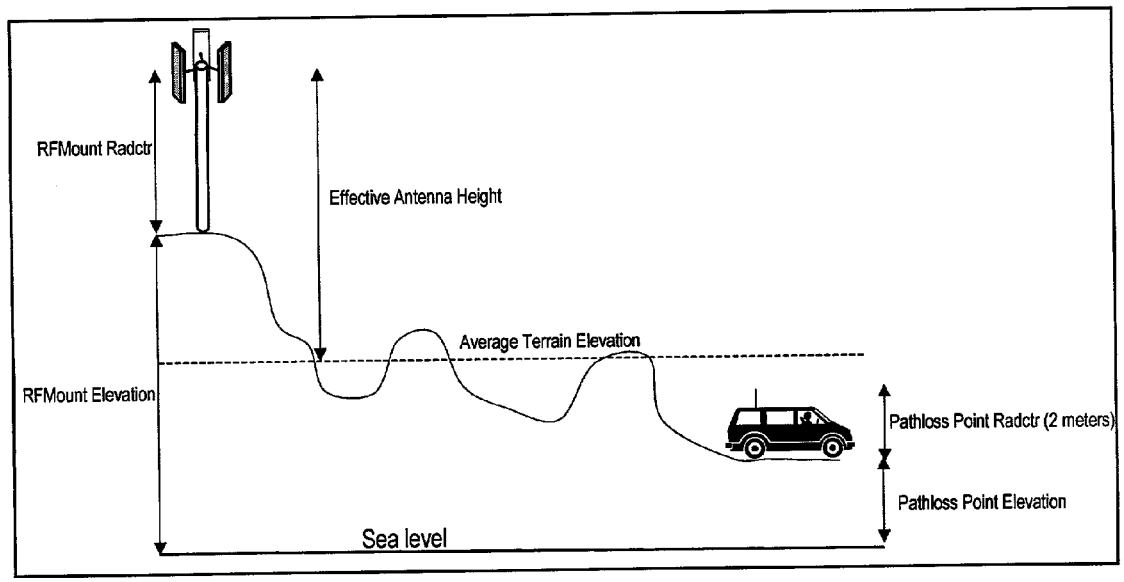
FIG. 13 illustrates an example of calculating the effective antenna height using the height above average terrain (HAAT) method.

In propagation modeling, the height of the transmit and receive antennas has a direct effect on the total path loss for a given link. Increasing antenna height generally reduces pathloss. In a flat earth model, antenna height is an easily determined attribute. In a real world scenario with variable terrain, there are different techniques for dealing with antenna height, as illustrated in FIG. 13. Most treatments of antenna height neglect the mobile antenna height. The mobile antenna height is typically in the range of 1.5–2.0 meters. The base station antenna height has considerably more variation.

In the pathloss data generation, effective antenna height is used in the generic propagation model. The diffraction algorithm uses an actual antenna height rather than an effective antenna height. However, the diffraction algorithm directly calculates the terrain effects on propagation and is a more precise measure.

for the generic propagation model, the effective antenna height is calculated as height above average terrain (HAAT). Average terrain elevation is extracted from the terrain database. FIG. 13 shows an example of calculating effective antenna height using HAAT.

Figure 14:
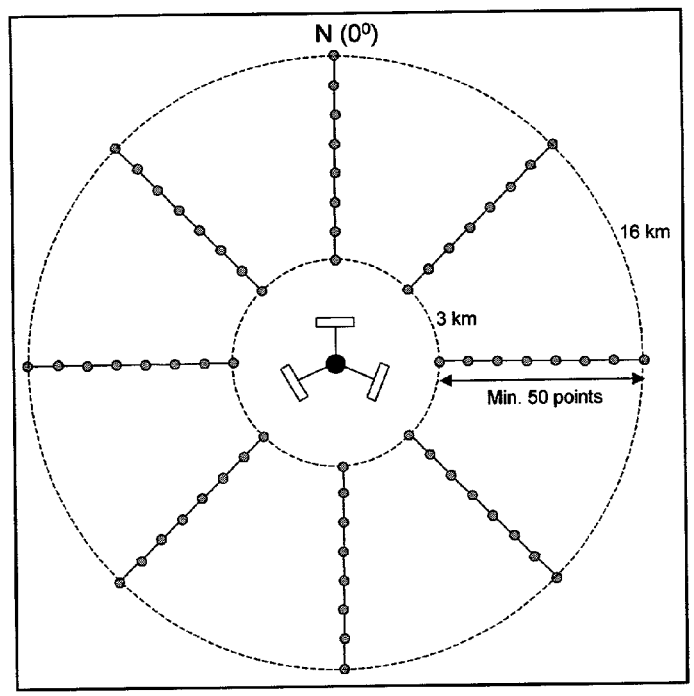
FIG. 14 illustrates the static method for computing average terrain elevation.

The FCC has defined a standard method for computing average terrain to be used by public mobile services in all application filings. With this method, eight uniformly distributed radials are drawn from the RFMount starting with true north (0°). A minimum of fifty evenly spaced elevation points are collected between 3 km and 16 km (2 to 10 miles) along each radial. An average elevation is computed for each radial. Then, the radial elevations are averaged to produce a final average terrain elevation. FIG. 14 shows the static method for computing average terrain elevation.

Figure 15:
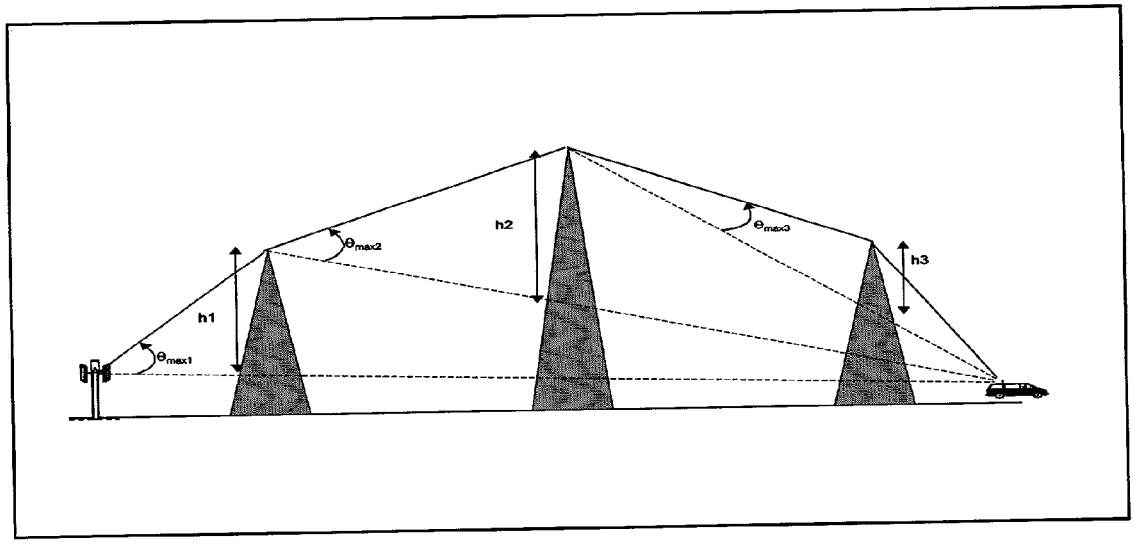
FIG. 15 illustrates a representative Picquenard model.

As illustrated in FIG. 15, the diffraction algorithm of the propagation model calculates how obstructions interfere with the signal path between the RFMount and pathloss point. The diffraction algorithm employs the Picquenard model. In this model, the effective height of a first obstacle is measured from the baseline formed by a segment connecting the transmitter and the receiver. The effective height of each succeeding obstacle is measured from a baseline segment drawn from the top of the previous obstacle to the receiver.

Diffraction values are calculated for measured pathloss points during coefficient generation. A particular RFMount may be associated with 40,000 or more measured pathloss points. Calculating a separate elevation profile for each pathloss point is computationally inefficient.

Figure 16:
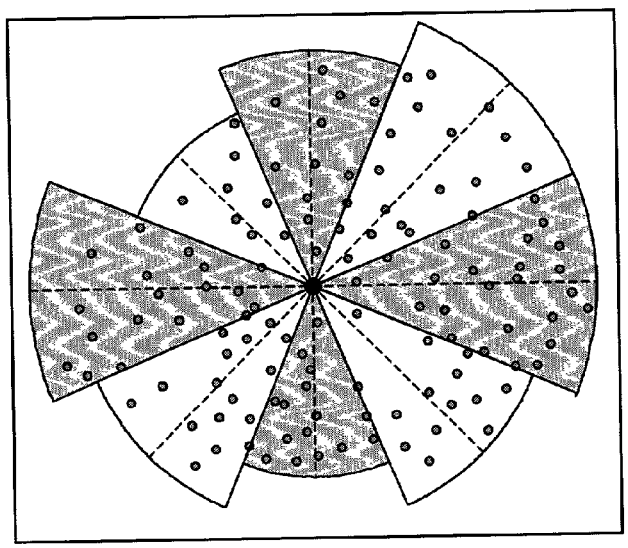
FIG. 16 illustrates the measured pathloss points assigned to numerous radial regions.

As illustrated in FIG. 16, an alternative approach divides the region around the RFMount into segmented areas. A single diffraction value is calculated for each area and assigned to all pathloss points within the area. To implement the segmented area approach, the diffraction algorithm requires the following inputs:
  RFMount;
  Receiver height (float meters);
  Signal frequency (float MHZ);
  Number of radials (int); and
  Step size along radial (int meters).

Using the number of radials, the area around the RFMount is divided into radial regions with uniform angular spacing. Each pathloss point is assigned to a particular radial region based on its location. The length of each radial region is set equal to the distance to the furthest pathloss point in that region (each radial region can have a different length). FIG. 16 shows the measured pathloss points assigned to radial regions.

Figure 17:
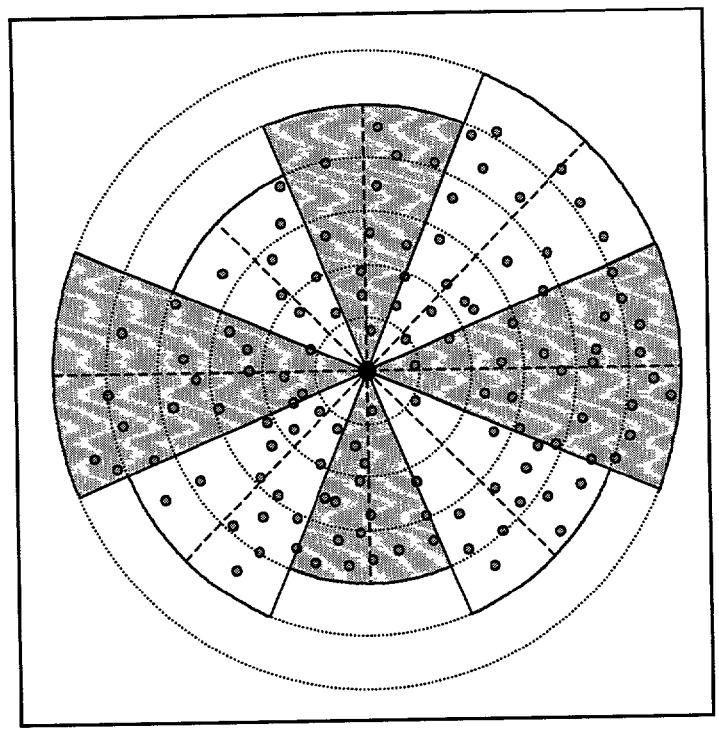
FIG. 17 illustrates the radial regions of FIG. 16 divided into sections having a uniform step size.
Figure 18:
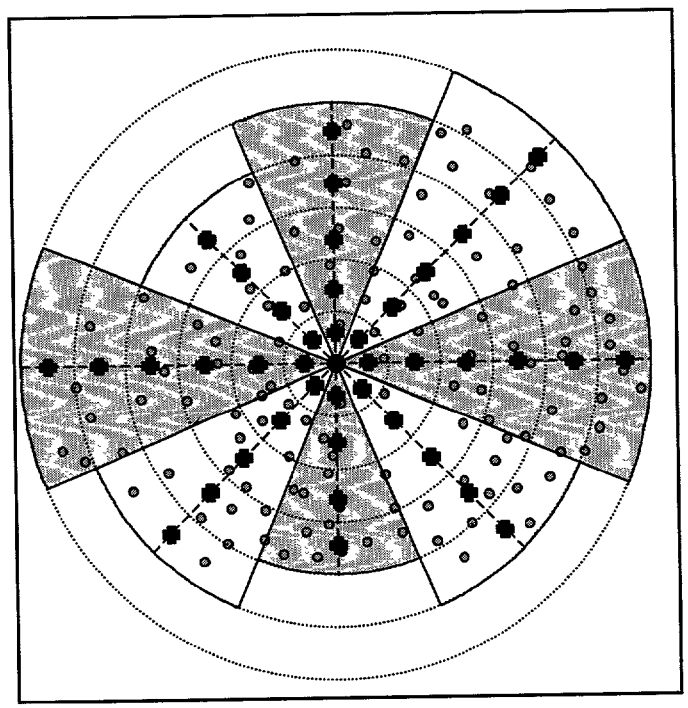
FIG. 18 graphically illustrates a method for calculating diffraction in each section of FIG. 17.

Next, each radial region is divided into concentric sections using the uniform step size as shown in FIG. 17. Finally, a diffraction value is calculated in the center of each section of each region. The calculated diffraction value is assigned to all pathloss points in the section of each region. FIG. 18 shows the final configuration.

Generic propagation models are based on best-fit calculations of measured field data. When applying a generic model to a different location, the accuracy of the results will depend on how closely the characteristics of the new location match those of the location where the model was derived. In accordance with the present invention, measured data for each location is compared to the path loss values calculated by the pathloss data algorithm. Based on this comparison, new coefficient values are calculated to minimize the variance between the measured and modeled values. The comparison can be accomplished in any of a number of manners, including simple substitution, iterative convergence or regression analysis. Once the propagation model has been optimized, new pathloss points may be modeled.

Coefficient generation is used to determine the set of weighting factors that minimizes the variance between the propagation model and the measured value. The equation for the generic propagation model:

$$PL_{RFMount} = w_0 c_0 + w_1 c_2 - w_0 c_1 \log_{10}(h) + w_1 c_3 \log_{10}(h) \log_{10}(r) + w_2 (\text{diffraction}) + w_3 (\text{local effects})$$

Combining common terms provides the equation:

$$PL_{RFMount} = b_0 + b_1 \log_{10}(h) + b_2 \log_{10}(h) \log_{10}(r) + b_3 (\text{diffraction}) + b_4 (\text{local effects})$$

where,
  $b_0 = w_0 c_0 + w_1 c_2$;
  $b_1 = -w_0 c$;
  $b_2 = -w_1 c_3$;
  $b_3 = w_2$; and
  $b_4 = w_3$;
  h=the effective height of the RFMount in meters;
  r=the distance between the RFMount and the pathloss point in meters;
  diffraction=diffraction component; and
  local effects=a correction factor to adjust for local terrain type.

In this final form of the generic equation, $b_0$ through $b_4$ are the pathloss coefficients. The pathloss equation fits the regression model, where:

$$x_1 = \log_{10}(h)$$

$$x_2 = \log_{10}(h) \log_{10}(r)$$

$$x_3 = \text{diffraction}$$

$$x_4 = \text{local\_effects}$$

An analysis with measured data is required to confirm that the pathloss varies linearly with the diffraction and local effects values. To perform pathloss coefficients generation for an existing RFMount, the following inputs are required:
  RFMount;
  Receiver Height (meters); and
  Signal frequency (MHZ).

For each point in the pathloss point list, the pathloss coefficients generator algorithm calculates values for $x_1$ through $x_4$. Each set of x's and the measured pathloss ($y_i$) form a row in the observations matrix. When all of the pathloss points are processed, the least-squares matrix is formed. The pathloss coefficients are calculated through the solution of the least-squares matrix.

To be useful, the coefficient generator must indicate how closely the modeled propagation values match the measured values. The resulting pathloss values must also include a variance value describing the expected bounds for pathloss at a given pathloss point. Regression analysis provides a number of methods for interpreting the results that are calculated along with the estimated coefficients. The coefficient generator will provide the following values for analysis of variance:
  Variance: The variance of the modeled pathloss value; and
  Variance and Standard deviation apply to the resulting pathloss value.

The same variance calculated in the coefficients generator algorithm applies to all pathloss points modeled with the same coefficients. Since the variance of measured values changes as a function of the measurement environment, it is possible that on a point-by-point analysis, the modeled variance will be less than the measured variance. Variance must be analyzed based on complete sets of data in order to be valid.

The coefficient generator algorithm is also used to calculate propagation components for a new (or simulated)

Figure 19:
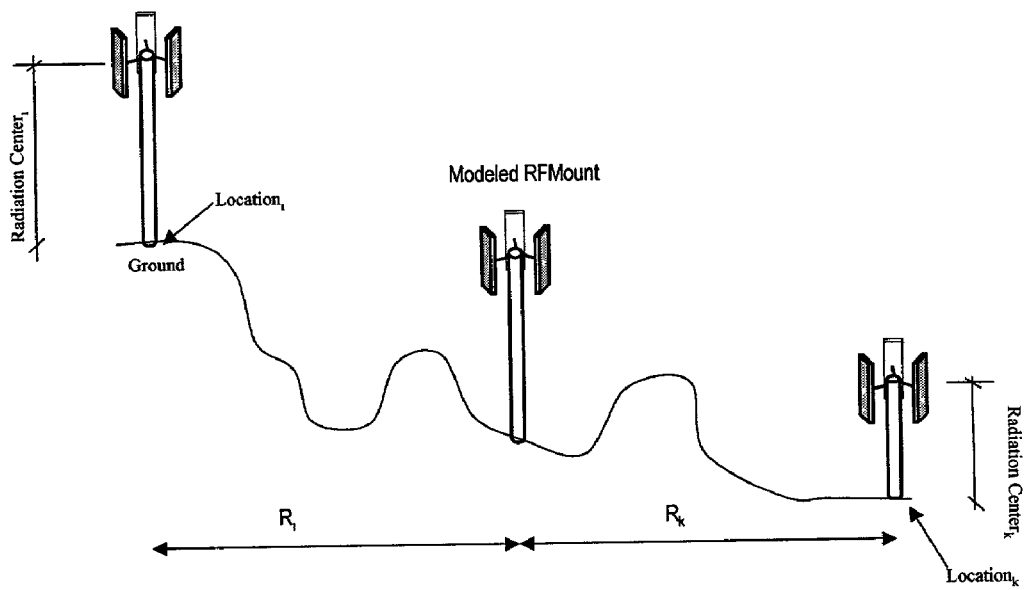
FIG. 19 illustrates the measurement of radiation center offsets of modeled antennae in a system.

RFMount, such as illustrated in FIG. 19, having no measured data. In this case a new regression model is needed that determines the effects of antenna height, elevation, effective antenna height, and the distance between an existing RFMount and the modeled RFMount.

There are several methods that can be used to estimate values, and each has merits under different evaluation conditions. Kriging is an estimation method associated with spatial data that has several beneficial properties and can be used to calculate coefficient values for the modeled RFMount.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of refining the determination of the quality of signal coverage in a wireless system, comprising the steps of:
   measuring actual path loss data at a plurality of locations within said wireless system by gathering signal level data at said plurality of locations, differentiating individual signals within said signal level data, determining the sector of origin of each of the individual signals, determining the path loss for each of the individual signals, retrieving a set of antenna parameters for each antenna corresponding to the sector of origin for each antenna, and normalizing the path loss value for each signal as a function of the retrieved antenna parameters;
   obtaining predicted path loss data from a propagation model applied to said wireless system; and
   combining said measured data and said predicted data to augment said measured path loss data to determine data for locations without measured data.

2. The method of claim 1, wherein:
   said combination is a weighted combination wherein said measured data and said predicted data are assigned confidence indicators to determine the optimal weighting of each of said data.

3. The method of claim 1, further comprising:
   assigning a confidence factor to each value within each set of data wherein said confidence factor is greater for measured data and is based upon the relationship between the data for a particular location and the data for proximate locations.

4. A method of managing the growth of a wireless system, comprising the steps of:
   sub-dividing a drive test region into a plurality of spatial bins;
   within each of said plurality of bins, measuring a signal from each of a plurality of sectors, which are within a region of examination that is at least partially co-extensive with or within propagation distance of said drive test region, to determine the receive power of said measure signal;
   removing the effective gain achieved by an antenna associated with each said measured signals to normalize each of said measured signals to a conceptual antenna having an isotropic radiation pattern;
   applying a propagation model to a conceptual signal from each sector of said plurality of sectors to determine the predicted receive power of the conceptual signal within each of said plurality of bins, wherein each of said modeled conceptual signals corresponds to a different one of said measured signals and the characteristics of said conceptual antenna are used to model said conceptual signals; and
   correlating each of said measured signals with said corresponding modeled conceptual signal.

5. The method of claim 4, further comprising the step of:
   revising said propagation model, based on said correlation between each measured signal with said corresponding modeled conceptual signal, to create a revised propagation model that better predicts an expected path loss of said conceptual signal.

6. The method of claim 5, further comprising the step of:
   applying said revised propagation model to said conceptual signal from each sector of said plurality of sectors to determine the expected path loss to a number of additional spatial bins.

7. The method of claim 5, further comprising the step of:
   applying said revised propagation model to a planned signal from each sector of a planned plurality of sectors to determine the expected path loss of said planned signal to each of said plurality of bins.

8. The method of claim 7, further comprising the step of:
   varying a propagation parameter value of said planned signal;
   applying said revised propagation model to said planned signal and each of said plurality of bins; and
   identifying an improved overall co-channel signal-to-noise ratio for said system based upon a revised propagation corresponding to a set of varied propagation parameters.

* * * * *